United States Patent
Ohara (10) Patent No.: US 9,091,302 B2
(45) Date of Patent: Jul. 28, 2015

(54) BEARING WITH MAGNETIC FLUID SEAL

(71) Applicant: GLOBERIDE, INC., Higashi Kurume-shi, Tokyo (JP)

(72) Inventor: Takeshige Ohara, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 14/342,747

(22) PCT Filed: Apr. 16, 2013

(86) PCT No.: PCT/JP2013/061269
§ 371 (c)(1),
(2) Date: Mar. 4, 2014

(87) PCT Pub. No.: WO2013/161625
PCT Pub. Date: Oct. 31, 2013

(65) Prior Publication Data
US 2015/0063733 A1 Mar. 5, 2015

(30) Foreign Application Priority Data
Apr. 26, 2012 (JP) .................................. 2012-100551

(51) Int. Cl.
*F16C 33/72* (2006.01)
*F16J 15/43* (2006.01)
*F16C 33/76* (2006.01)
*F16C 33/78* (2006.01)
*F16C 19/06* (2006.01)

(52) U.S. Cl.
CPC ........... *F16C 33/765* (2013.01); *F16C 33/7846* (2013.01); *F16C 33/7889* (2013.01); *F16J 15/43* (2013.01); *F16C 19/06* (2013.01)

(58) Field of Classification Search
CPC ........................... F16C 33/765; F16C 33/6644
USPC ........... 277/301, 302; 384/410–412, 446, 462
See application file for complete search history.

(56) References Cited

U.S. PATENT DOCUMENTS

| 5,051,853 A | * | 9/1991 | Hosoya | 360/99.08 |
| 5,152,539 A | * | 10/1992 | Takii et al. | 277/347 |
| 5,161,902 A | * | 11/1992 | Fujii | 277/410 |

FOREIGN PATENT DOCUMENTS

| JP | 57-33222 | 2/1982 |
| JP | 02138519 A | * 5/1990 |

(Continued)

OTHER PUBLICATIONS

International Search Report for PCT/JP2013/061269.

(Continued)

*Primary Examiner* — Phillip A Johnson
(74) *Attorney, Agent, or Firm* — Pillsbury Winthrop Shaw Pittman LLP (57) ABSTRACT

A bearing with a magnetic fluid seal, wherein a plurality of rolling elements are interposed between an inner ring and an outer ring, and a ring-shaped magnet is arranged at an opening side of the inner and outer rings so as to retain magnetic fluid for sealing the plurality of rolling elements, and
  wherein the ring-shaped magnet is magnetized such that magnetic poles are oriented in an axial direction, the bearing comprising:
  a ring-shaped pole plate arranged so as to be in contact with an outer side surface of the ring-shaped magnet in the axial direction;
  outer-ring-side magnetic fluid retained between the outer ring and the ring-shaped pole plate and/or between the outer ring and the ring-shaped magnet; and
  inner-ring-side magnetic fluid retained between the inner ring and the ring-shaped pole plate and/or between the inner ring and the ring-shaped magnet.

16 Claims, 6 Drawing Sheets

(56) References Cited

FOREIGN PATENT DOCUMENTS

| | | | |
|---|---|---|---|
| JP | 02286967 A | * | 11/1990 |
| JP | 4-29680 | | 1/1992 |
| JP | 5-65922 | | 3/1993 |
| JP | 2004-251293 | | 9/2004 |

OTHER PUBLICATIONS

European Search Report dated Apr. 8, 2015 for Appln. No. 13781951.2.

Japanese Office Action dated Apr. 23, 2015 for Japanese Appln. No. 2012-100551.

* cited by examiner

BEARING WITH MAGNETIC FLUID SEAL

CROSS-REFERENCE TO RELATED APPLICATIONS

This is the U.S. National Stage of PCT/JP2013/061269, filed Apr. 16, 2013, which in turn claims priority to Japanese Patent Application No. 2013-100551, filed Apr. 26, 2012, the entire contents of all applications are incorporated herein by reference in their entireties.

TECHNICAL FIELD

The present invention relates to a bearing with a magnetic fluid seal which supports a rotating shaft in a rotatable manner in various power transmission mechanisms, the magnetic fluid seal preventing foreign matter, such as dust and moisture, from intruding into an inner region of the bearing.

This application claims priority from Japanese Patent Application No. 2012-100551 (filed Apr. 26, 2012), the entire contents of which are hereby incorporated by reference herein.

BACKGROUND ART

In general, rotating shafts installed in various drive power transmission mechanisms are rotatably supported by bearings. In this case, so-called ball bearings are often used. Ball bearings include a plurality of rolling elements (rolling members) arranged in a circumferential direction in a space between an inner ring and an outer ring. The rotational performance of rotating shafts can be increased by using bearings of this type.

This type of bearing is used as means for supporting a rotating shaft in a drive power transmission mechanism for various drive devices. Some drive devices are required to prevent foreign matter, such as dust and moisture, from intruding into an inner region thereof through a bearing section. If foreign matter intrudes into the bearing itself, there will be a problem that the rotational performance will be degraded or abnormal noise will be generated. To solve this problem, a seal member made of an elastic material may be arranged on the outer periphery of the rotating shaft in the vicinity of the bearing, so that the bearing section is waterproof and dustproof. However, in this case, the rotational performance of the rotating shaft is degraded due to the influence of a contact pressure applied by the sealing member made of an elastic material.

Bearings having magnetic fluid seal mechanisms in which magnetic fluid is used (hereinafter referred to as bearings with magnetic fluid seals) are known structures that prevent foreign matter from intruding into the bearing section without reducing the rotational performance of the rotating shaft. For example, PTL 1 discloses a ball bearing in which rolling elements are retained between an outer ring and an inner ring and in which a magnetic member is interposed between the outer ring and the inner ring that rotate relative to each other, the magnetic member being fixed at one side thereof and magnetic fluid being disposed in a seal gap provided at the other side of the magnetic member. More specifically, the magnetic member is disposed between the inner ring and the outer ring so as to block the rolling elements, the magnetic member being fixed at one side thereof and the magnetic fluid being disposed in the seal gap provided at the other side of the magnetic member. Accordingly, the rolling elements are tightly sealed and intrusion of foreign matter into a rolling element section, which affects the rotational performance, is prevented.

CITATION LIST

Patent Literature

PTL 1: Japanese Unexamined Patent Application Publication No. 57-33222

SUMMARY

Technical Problem

The above-described bearing with the magnetic fluid seal disclosed in PTL 1 provides a sufficient sealing effect for dust and liquid having a relatively high viscosity. However, there is a possibility that the sealing effect will not be sufficient for liquid having a low viscosity. More specifically, the dimensional accuracy of the magnetic member is lower than those of components included in the bearing, and therefore the magnetic member easily allows liquid to intrude into the bearing at the fixed side thereof. The lower the velocity of the liquid, the more easily the liquid intrudes into the rolling element section (in particular, intrusion of seawater leads to a degradation of rotational performance since the seawater that has intruded dries and forms salt crystals). In this case, to reliably seal the bearing, it is necessary to accurately control the dimensions of the magnetic member or install additional sealing components. As a result, productivity will be reduced.

The present invention has been made in light of the above-described problems, and an object of the present invention is to provide a bearing with a magnetic fluid seal which reliably maintains the state in which a rolling element section in the bearing is sealed and which has a structure that ensures high productivity.

Solution to Problem

To achieve the above-described object, according to the present invention, a bearing with a magnetic fluid seat wherein a plurality of rolling elements are interposed between an inner ring and an outer ring, and a ring-shaped magnet is arranged at an opening side of the inner and outer rings so as to retain magnetic fluid, so that the plurality of rolling elements are sealed, is characterized in that the ring-shaped magnet is magnetized so that magnetic poles are oriented in an axial direction, and the bearing includes a ring-shaped pole plate arranged so as to be in contact with an outer side surface of the ring-shaped magnet in the axial direction; outer-ring-side magnetic fluid retained between the outer ring and the ring-shaped pole plate and/or between the outer ring and the ring-shaped magnet and inner-ring-side magnetic fluid retained between the inner ring and the ring-shaped pole plate and/or between the inner ring and the ring-shaped magnet.

In the above-described structure, the ring-shaped magnet is magnetized so that the magnetic poles are oriented in the axial direction, and the ring-shaped pole plate is arranged so as to be in contact with the outer side surface of the ring-shaped magnet in the axial direction. Therefore, the magnetic fluid (outer-ring-side magnetic fluid) can be retained between the outer ring and the ring-shaped pole plate and/or between the outer ring and the ring-shaped magnet; and the magnetic fluid (inner-ring-side magnetic fluid) can be retained between the inner ring and the ring-shaped pole plate and/or between the inner ring and the ring-shaped magnet. In other words, the magnetic fluid may be retained in both a gap on the inner peripheral surface of the outer ring and a gap on the outer peripheral surface of the inner ring. Therefore, sufficient sealing effect can be achieved for the rolling elements even when the dimensional accuracy of the ring-shaped magnet is low, and it is not necessary to accurately control the dimensions of the ring-shaped magnet. As a result, the assembly can be facilitated and productivity can be increased.

The magnetic fluid retained on the inner peripheral surface of the outer ring and the outer peripheral surface of the inner ring may either be provided at only one of the openings at the ends of the bearing or be provided at both of the openings.

Advantageous Effects

According to the present invention, a bearing with a magnetic fluid seal which reliably maintains the state in which a rolling element section in the bearing is sealed and which has a structure that ensures high productivity.

DESCRIPTION OF EMBODIMENTS

Bearings with magnetic fluid seals according to embodiments of the present invention will now be described with reference to the drawings.

Figure 1:
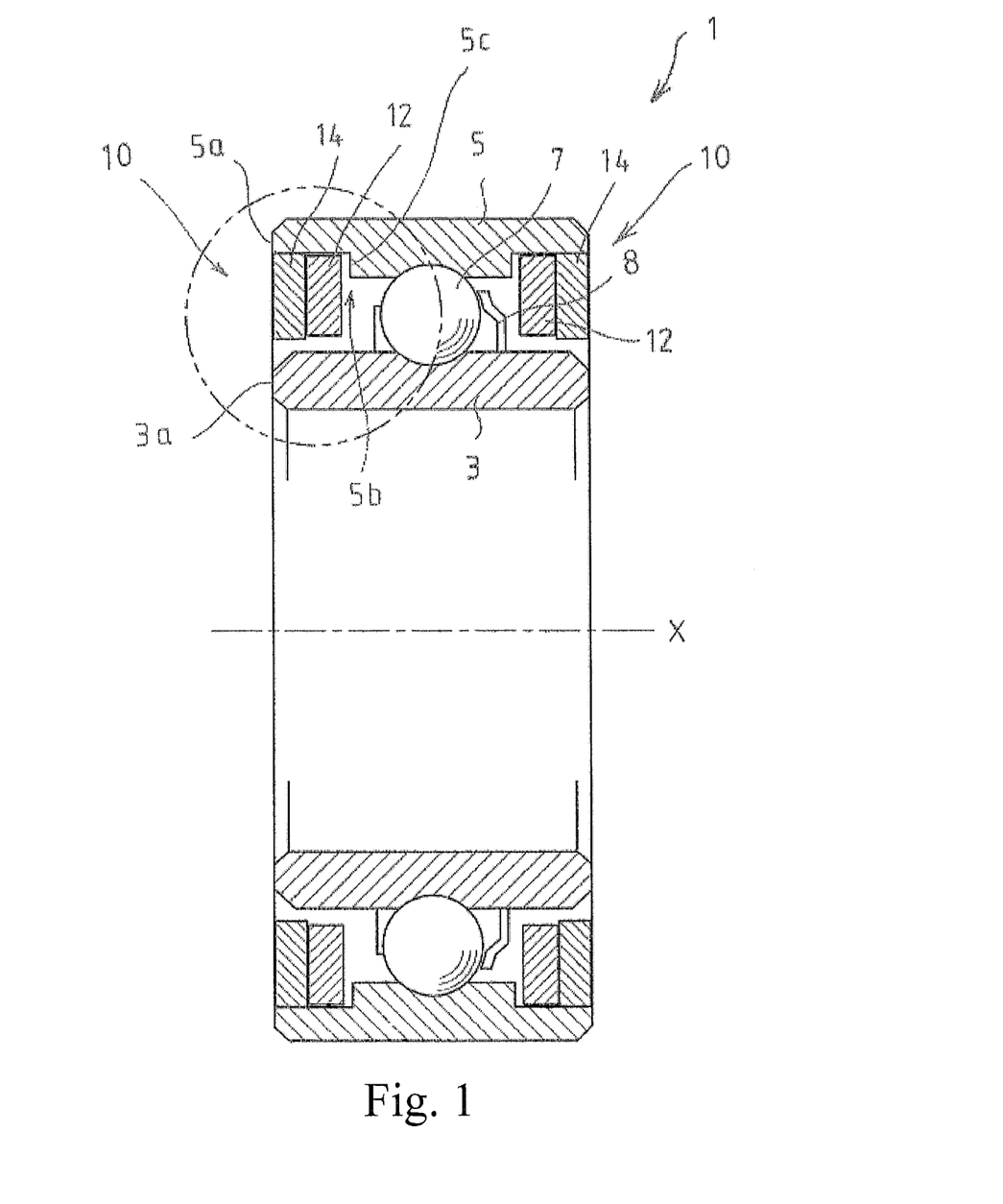
FIG. 1 is a sectional view of a bearing with a magnetic fluid seal according to a first embodiment of the present invention taken in an axial direction.
Figure 2:
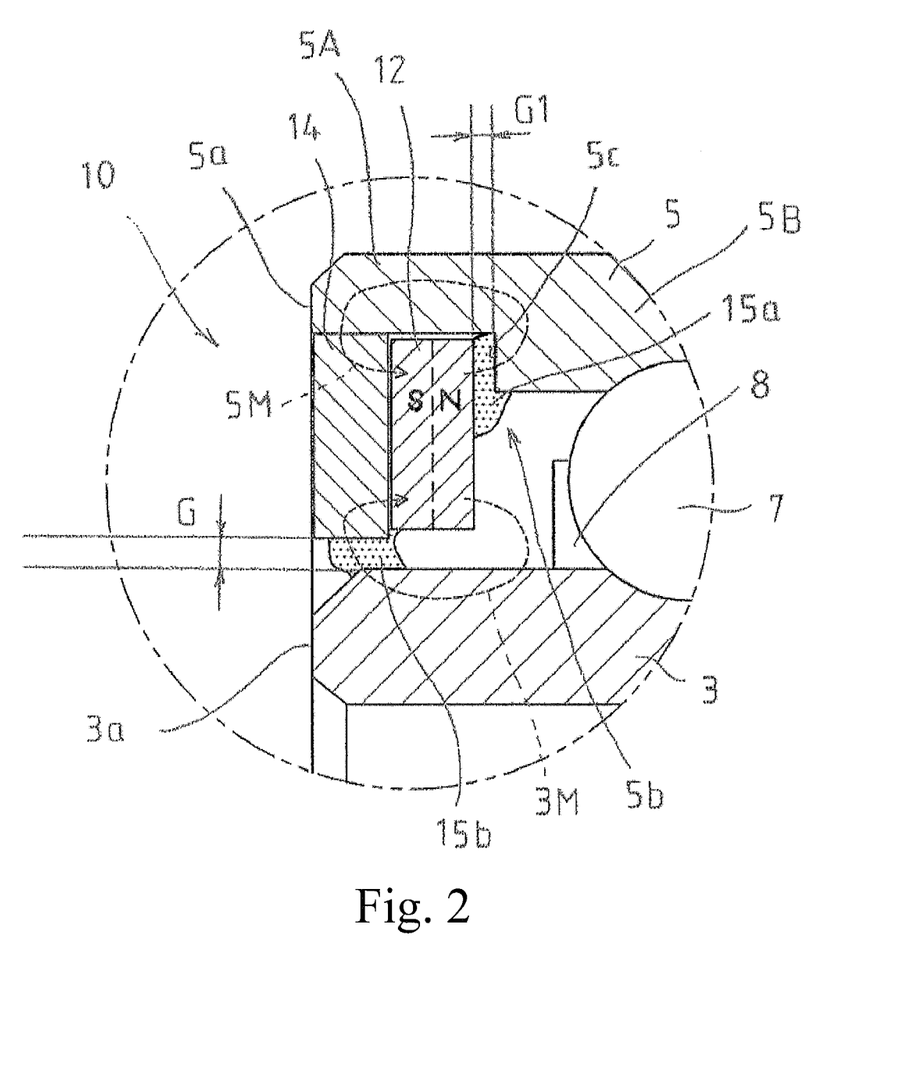
FIG. 2 is an enlarged view of a relevant part in FIG. 1.

FIGS. 1 and 2 illustrate a bearing with a magnetic fluid seal according to the first embodiment of the present invention. FIG. 1 is a sectional view taken in an axial direction, and FIG. 2 is enlarged view of a relevant part in FIG. 1.

The bearing with a magnetic fluid seal (hereinafter referred to also as a bearing) 1 according to this embodiment may include a cylindrical inner ring 3, a cylindrical outer ring 5 that may surround the inner ring 3, and a plurality of rolling elements (rolling members) 7 that may be interposed between the inner ring 3 and the outer ring 5. The rolling elements 7 may be retained by a retainer (retaining member) 8, which may extend in a circumferential direction, and the inner ring 3 and the outer ring 5 may be rotatable relative to each other.

The inner ring 3, the outer ring 5, and the rolling elements 7 may be made of a magnetic material, such as a chromium stainless steel (SUS440C). The retainer 8 may be made of a material having a high corrosion resistance and a high heat resistance, such as a stainless steel (SUS304). It is not necessary that the rolling elements 7 be magnetic members. In this embodiment, the outer ring 5 may be formed such that an exposed end surface 5a thereof is flush with (or substantially flush with) an exposed end surface 3a of the inner ring 3. However, as in a third embodiment, which will be described below, the outer ring 5 may be longer than the inner ring 3 in the axial direction (the outer ring 5 may include an elongate cylindrical portion that projects from the inner ring 3 in the axial direction). Alternatively, the inner ring 3 may be longer than the outer ring 5 in the axial direction.

Magnetic fluid seals 10, which will be described in detail below, may be provided at opening sides of the inner ring 3 and the outer ring 5. In this embodiment, magnetic fluid seals having the same structure may be provided at the openings at both sides of the inner ring 3 and the outer ring 5. Therefore, in the following description, the structure at only one side (left side in FIG. 1) will be described.

The magnetic fluid seal 10 may include a ring-shaped magnet (hereinafter referred to as a magnet) 12, a ring-shaped pole plate (hereinafter referred to as a pole plate) 14 arranged so as to be in contact with an outer side surface of the magnet 12 in the axial direction, and magnetic fluid (outer-ring-side magnetic fluid 15a and inner-ring-side magnetic fluid 15b) retained by magnetic circuits formed by the magnet 12. These components may provide a sealing function for preventing dust, moisture, etc., from intruding into a region around the rolling elements 7.

The magnet 12 may be a permanent magnet having a high magnetic flux density and a strong magnetic force; for example, a neodymium magnet formed by sintering may be used. As illustrated in FIG. 2, the magnet 12 may be magnetized in advance so that magnetic poles (S pole and N pole) are oriented in the axial direction (direction of central axis X of the bearing). The pole plate 14 may be disposed so as to be in contact with the outer side surface of the magnet 12 in the axial direction. The pole plate 14 and the magnet 12 may have substantially the same shape, and the pole plate 14 may be made of a magnetic material, such as a chromium stainless steel (SUS440C).

In this embodiment, the magnet 12 and the pole plate 14 may be bonded together in advance; however it is not necessary to bond them together in advance. When the magnet 12 and the pole plate 14 are bonded together in advance, positioning and centering of the magnet 12 can be facilitated. In addition, since the magnet 12 and the pole plate 14 are unitized, the assembly process, which will be described below, can also be facilitated.

The outer-ring-side magnetic fluid 15a and the inner-ring-side magnetic fluid 15b may be formed by dispersing fine magnetic particles composed of, for example, $Fe_3O_4$, into a surface-active agent and a base oil. The outer-ring-side magnetic fluid 15a and the inner-ring-side magnetic fluid 15b may be viscous and have a characteristic such that they react to a magnet when the magnet is brought close thereto. Therefore, the outer-ring-side magnetic fluid 15a and the inner-ring-side magnetic fluid 15b may be reliably retained at predetermined positions by magnetic circuits formed by the magnet 12 and the inner ring 3, the outer ring 5, and the pole plate 14, which may be formed of a magnetic material.

A step 5b may be formed on an inner surface of the outer ring 5 at a position closer to the rolling elements than the magnet 12. Owing to this step 5c, the outer ring 5 may include a thin portion 5A at the opening side and a thick portion 5B at the rotating-element side, and the distance between the inner and outer rings may be greater at the outer side than at the inner side in the axial direction. The step 5b may be formed so that a gap for retaining the magnetic fluid (step gap) is provided. In this embodiment, the step 5b may be formed so as to have a perpendicular surface 5c that is perpendicular to the axial direction (when the perpendicular surface is formed, the magnet 12 may be attached to the perpendicular surface by attraction so that the magnet 12 is positioned and secured, as described below). The step is not limited to that having a perpendicular surface as in this embodiment, and may instead have a staircase shape or an oblique shape (oblique surface) as long as the magnetic fluid can be reliably retained between the step and the magnet 12. In this case, when an oblique surface is formed, the magnet 12 can be positioned and the magnetic fluid can be retained.

The pole plate 14 may be formed such that the outer diameter thereof is slightly larger than the diameter of the inner peripheral surface of the outer ring 5 (inner peripheral surface of the thin portion 5A), and may be press-fitted to the outer ring 5 together with the magnet 12 bonded thereto at the opening side of the outer ring 5. The size of the pole plate 14 having the magnet 12 bonded thereto may be such that a predetermined gap G is formed between the pole plate 14 and the outer peripheral surface of the inner ring 3 when the pole plate 14 is press-fitted to the outer ring 5. The lengths of the magnet 12 and the pole plate 14 in the axial direction may be such that a gap G1 is formed on the perpendicular surface 5c of the step 5b when the magnet 12 and the pole plate 14, which are bonded together, are press-fitted.

When the pole plate 14 having the magnet 12 bonded thereto, the magnet 12 being magnetized so that the magnetic poles are oriented in the axial direction, is press-fitted to the outer ring 5 as described above, magnetic fluxes (magnetic circuits 3M and 5M) symmetrical in the axial direction may be formed at the inner-ring-3 side and the outer-ring-5 side, as illustrated in the figure. Therefore, the inner-ring-side magnetic fluid 15b may be retained in the above-described gap G between the pole plate 14 and the inner ring 3, and the outer-ring-side magnetic fluid 15a may be retained in the gap G1 between the magnet 12 and the outer ring 5. More specifically, when the magnetic fluid is injected into the gap G with an injection device, such as a syringe, the magnetic fluid may be retained in the gap G by the magnetic circuit 3M. In addition, the magnetic fluid may flow to the gap G1, and be retained also in the gap G1 by the magnetic circuit 5M formed at the outer-ring side.

With the bearing 1 having the above-described structure, the sealing effect can be provided also at the fixed side at which the magnet 12 and the pole plate 14 are fixed (on the inner peripheral surface of the outer ring 5 in this embodiment). Therefore, intrusion of moisture having a low viscosity or dust toward the rolling elements 7 can be reliably prevented at the fixed side. In a bearing with a magnetic fluid seal according to the related art, the necessity of a seal at the side at which a magnet and a pole plate are fixed is not considered, and the sealing effect for the rolling elements is not sufficient. In contrast, in this embodiment, a seal may be formed not only by the inner-ring-side magnetic fluid 15b but also by the outer-ring-side magnetic fluid 15a at the fixed side. Therefore, a sufficient sealing effect can be provided.

The seals may be formed simply by magnetizing the magnet 12, which may be a single member, so that the magnetic poles are oriented in the axial direction and arranging the magnet 12 so as to be in contact with the pole plate 14; therefore, the number of components may be small. In addition, it is not necessary that the dimensions of the magnet 12 be accurately controlled. As a result, the assembly can be facilitated and the cost can be reduced. In other words, even when a magnet whose dimensional accuracy is lower than those of other members is used, a sufficient sealing effect can be provided.

Furthermore, the magnet 12, which may retain the magnetic fluid at both the inner-ring side and the outer-ring side, may be formed as a single member, and the magnetic fluid seals at the inner-ring side and the outer-ring side can be formed at the same time by injecting the magnetic fluid at a single position. As a result, the work efficiency is increased.

In addition, in this embodiment, since the step 5b is formed on the outer ring 5, the space (step gap) in which the magnetic fluid can be reliably retained can be formed by using the step, and the sealing effect can be easily increased. Although the outer-ring-side magnetic fluid 15a is retained in the gap G1 in FIG. 2, the outer-ring-side magnetic fluid 15a may also be provided in a gap between the outer peripheral surface of the magnet 12 and the inner peripheral surface of the outer ring 5 and a small gap between the pole plate 14 and the inner peripheral surface of the outer ring 5. Thus, a sufficient sealing function can be provided at the outer-ring side.

Figure 3:
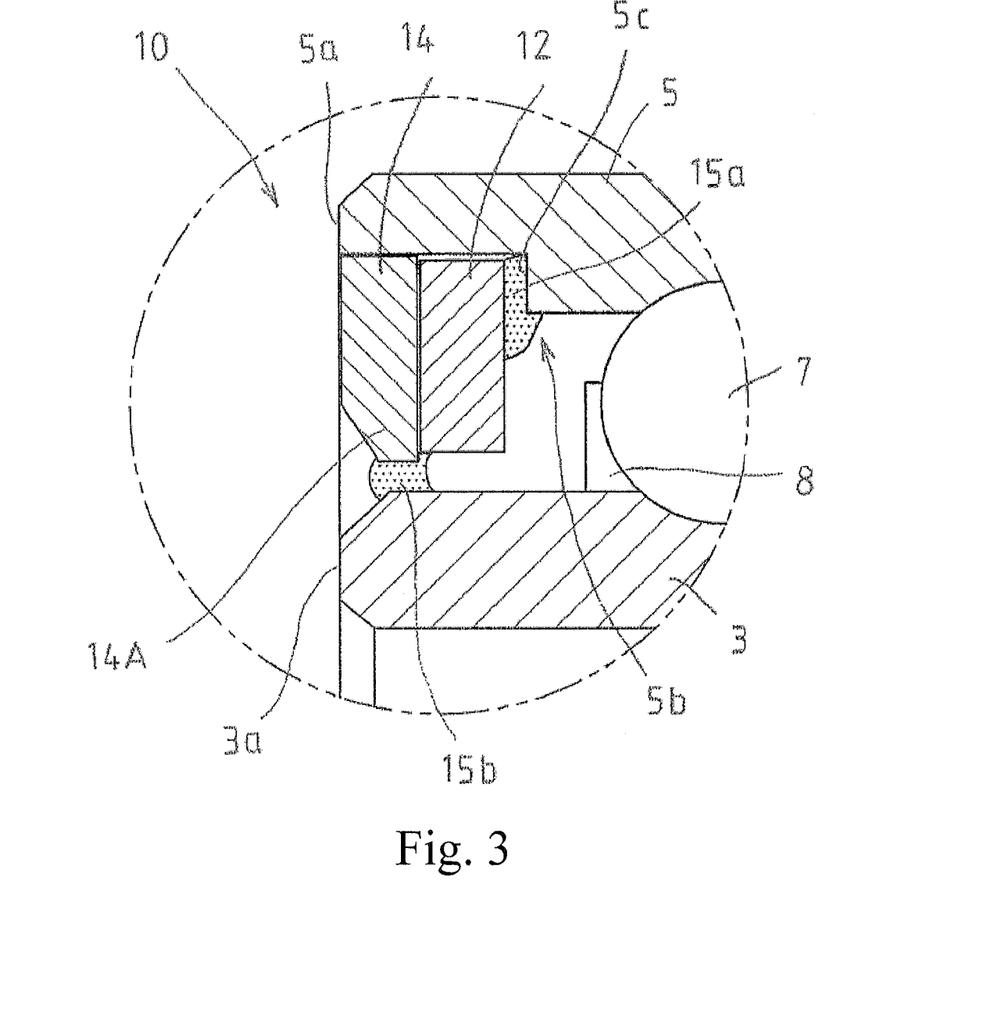
FIG. 3 is a diagram illustrating a modification of the first embodiment.

FIG. 3 is a diagram illustrating a modification of the above-described embodiment.

In the embodiment illustrated in FIGS. 1 and 2, the pole plate 14 has a constant thickness in the radial direction. However, as illustrated in FIG. 3, the pole plate 14 is preferably tapered so that the thickness thereof gradually decreases toward a portion that retains the magnetic fluid (radially inner portion in this embodiment) (thin portion is denoted by reference symbol 14A).

With this structure, the magnetic fluid 15b does not spill outward (beyond the exposed end surfaces 5a and 3a of the outer and inner rings) in the axial direction. Therefore, the magnetic fluid may be prevented from being wiped off during the assembly, and the injection process can be reliably performed.

Figure 4:
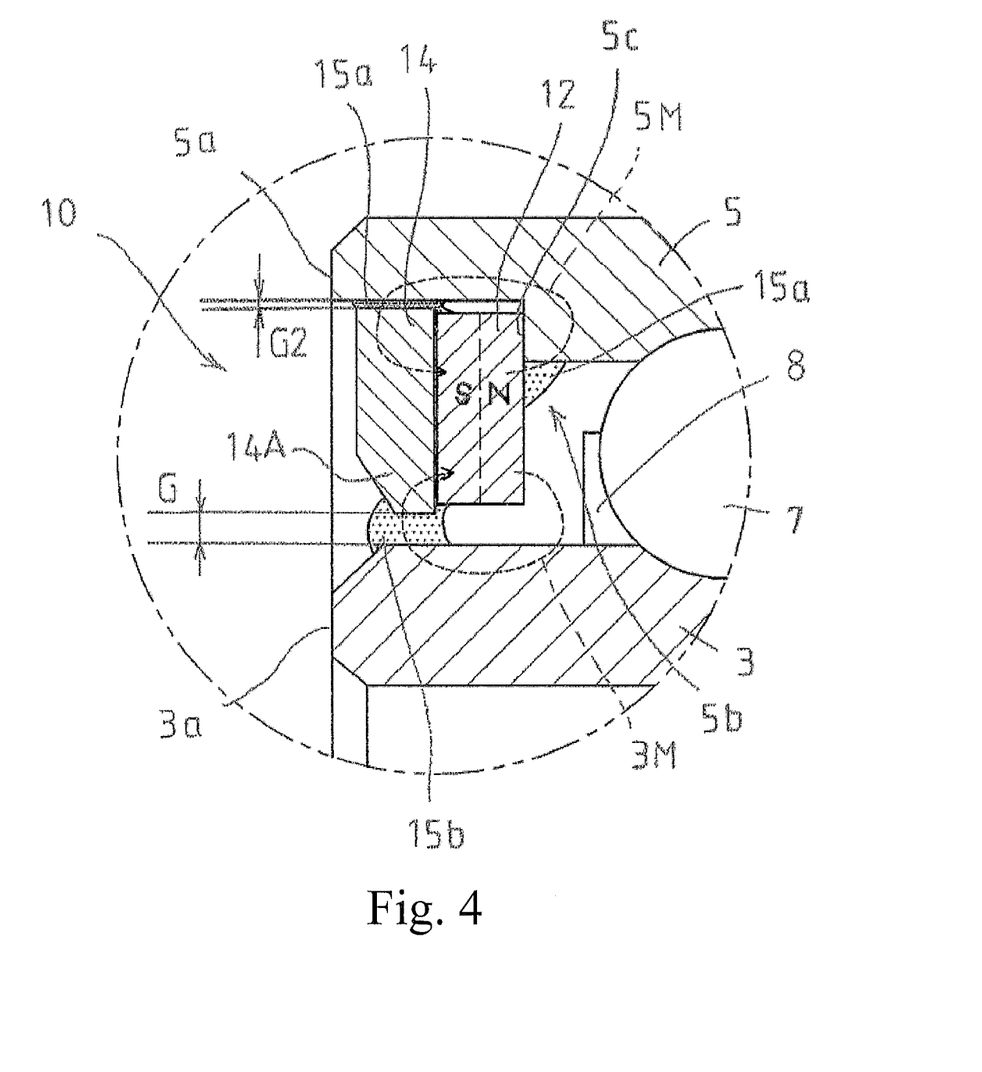
FIG. 4 is an enlarged sectional view of a relevant part of a bearing with a magnetic fluid seal according to a second embodiment of the present invention taken in an axial direction.

FIG. 4 illustrates a second embodiment of the present invention.

In this embodiment, the dimension of the pole plate 14 in the radial direction is set so that a certain clearance (gap G2) is provided between the pole plate 14 and the inner peripheral surface of the outer ring 5.

Therefore, when the pole plate 14 having the magnet 12 bonded thereto (it is not necessary that the magnet 12 be bonded to the pole plate 14) is simply inserted from the opening side of the inner and outer rings, the magnet 12 may come into contact with the perpendicular surface 5c of the step due to a magnetic attraction force, and thereby be positioned and secured. In this state, when the magnetic fluid is injected into the gap G and the gap G2 with an injection device, such as a syringe, the magnetic fluid is retained in the gap G (between the inner ring 3 and the pole plate 14) by the magnetic circuit 3M and in the gap G2 (between the outer ring 5 and the pole plate 14) by the magnetic circuit 5M. The magnetic fluid that fills the gap G may flow toward the step and be retained also in a step portion between the magnet 12 and the outer ring 5 (region between the magnet 12 and the outer ring 5). Therefore, the sealing effect at the outer-ring side may be increased.

With this structure, the pole plate 14 having the magnet 12 bonded thereto can be easily assembled. In addition, in the case where the openings at both sides of the bearing are to be sealed, the orientations of the magnets can be easily controlled. In addition, since the pole plate 14 is formed so that the gap G2 is provided, the outer ring 3 does not receive a deformation load during the assembly, and the rotational performance of the bearing is not degraded. In consideration of the ease of assembly and the sealing effect, the gap G2 may be set in the range of 10 to 500 μm, preferably in the range of 20 to 200 μm.

Figure 5:
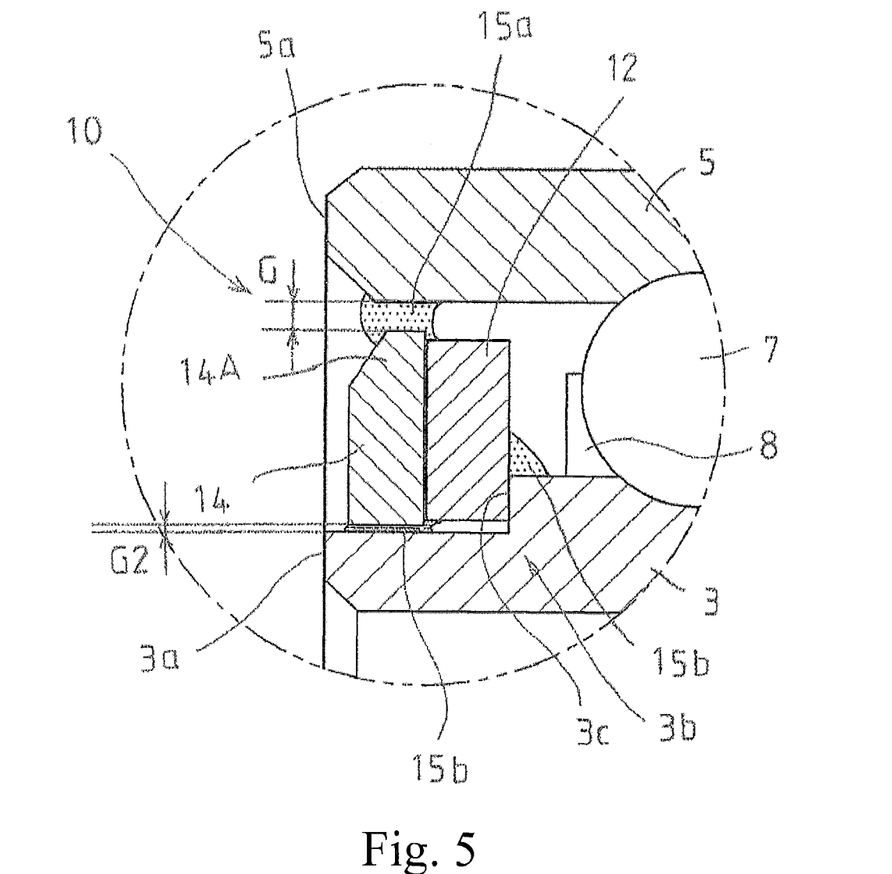
FIG. 5 is a diagram illustrating a modification of the second embodiment.

FIG. 5 is a diagram illustrating a modification of the second embodiment.

In this modification, a step 3b may be formed on an inner ring, and a perpendicular surface 3c that is perpendicular to an axial direction may be formed on the step 3b. A magnet 12 and a pole plate 14 similar to those in the structure illustrated in FIG. 4 may be disposed on the inner ring (the structure may be symmetrical to that illustrated in FIG. 4).

The bearing having this structure may be suitable for a case in which the outer ring is attached to a rotating member.

Also in the structures illustrated in FIGS. 1 to 3, the magnet 12 and the pole plate 14 may be attached to the inner ring as in the structure illustrated in FIG. 5.

Figure 6:
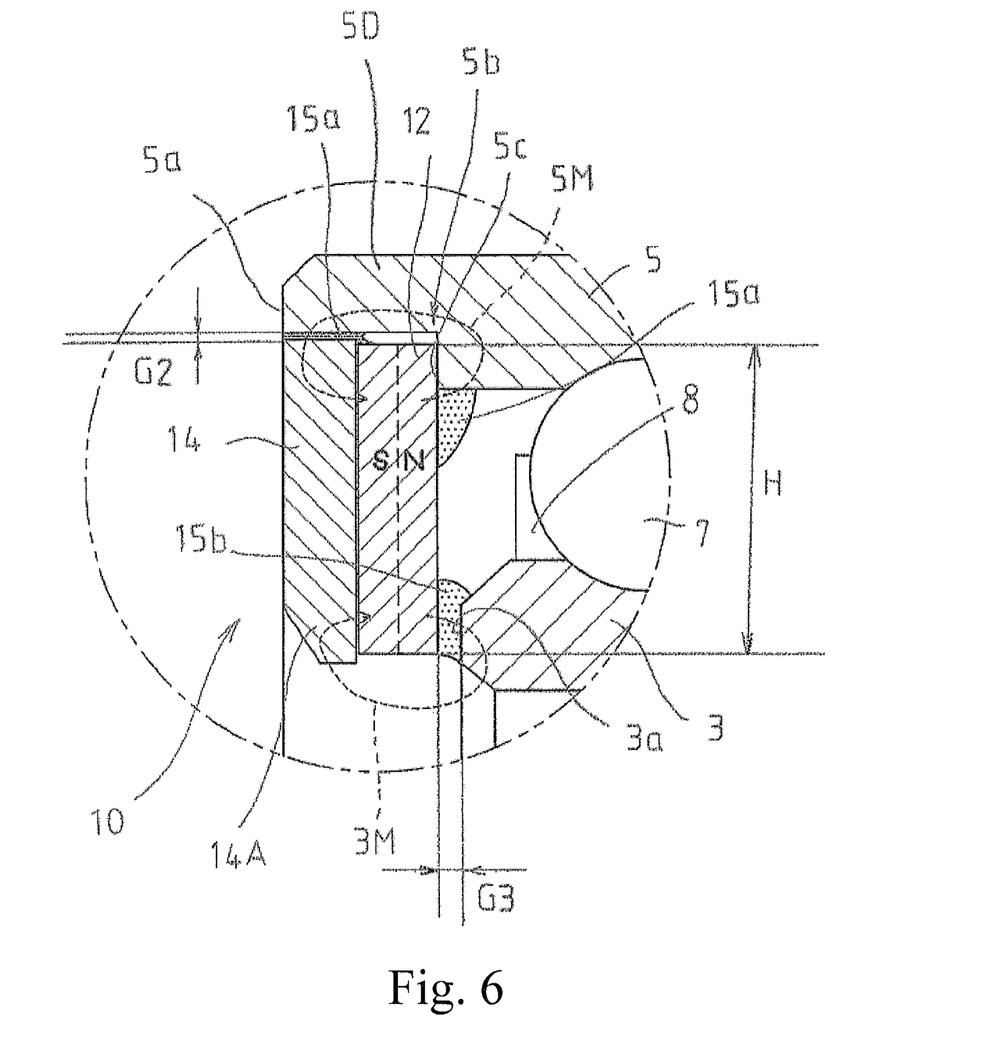
FIG. 6 is a sectional view of a bearing with a magnetic fluid seal according to a third embodiment of the present invention taken in an axial direction.

FIG. 6 is a diagram illustrating a third embodiment of the present invention.

In this embodiment, an outer ring 5 may be formed so as to be longer than an inner ring 3 in an axial direction, and may include an elongate cylindrical portion SD that projects from an exposed end surface 3a of the inner ring 3. A magnetic fluid seal 10 having a structure similar to the above-described structure may be provided on the elongate cylindrical portion SD.

In this case, the length of the elongate cylindrical portion SD in the axial direction may be set so that a gap G3 is provided between a magnet 12 and the exposed end surface 3a of the inner ring 3 in the state in which the magnet 12 is attached to a perpendicular surface 5c of a step 5b on the outer ring by attraction and is thereby positioned and secured. In the structure of this embodiment, the dimension H of the magnet 12 in the radial direction may be larger than those in the above-described embodiments and modifications. Therefore, the magnetic force can be increased and the sealing effect (ability to retain the magnetic fluid) can be enhanced. In addition, since inner-ring-side magnetic fluid 15b may be disposed in an inner region in the axial direction so as not to be exposed to the outside, the inner-ring-side magnetic fluid 15b may be prevented from being wiped off during the assembly, and an injection process can be reliably performed. Although the outer ring 5 has the elongate cylindrical portion in this embodiment, the inner ring 3 may instead have an elongate cylindrical portion.

In the structures of the above-described embodiments and modifications, the surfaces of the inner ring 3 and the outer ring 5 are preferably treated with electrolytic chromic acid. When the treatment with electrolytic chromic acid is performed, the occurrence of cracks and tears in the surfaces due to rust or corrosion can be prevented, and intrusion of dust and foreign matter into an inner region can be reliably prevented.

In addition, in the above-described structures, a ring-shaped shield (sealing cover) may be press-fitted to the outer surface of the pole plate 14, which is disposed at the opening side, in the axial direction from an outer position in the axial direction. The shield may be formed of a material having a high corrosion resistance and a high heat resistance, such as a stainless steel (SUS304) or a resin. When the shield is provided, intrusion of foreign matter can be more effectively prevented. In addition, magnetic matter such as iron sand (foreign matter) can be effectively prevented from adhering to the magnet 12.

In addition, in the above-described structures, a thin washer or a positioning spacer member may be disposed between the magnet 12 and the outer ring 5 (or the inner ring 3). When such a washer or a spacer is provided, dimensional control can be simplified and ease of assembly can be further improved. The washer or the spacer is preferably formed of a magnetic member so that stable magnetic circuits can be formed.

Examples

The bearings with the magnetic fluid seals having the above-described structures may be attached to rotating shaft portions of various devices that are required to be dustproof and waterproof. In particular, severe conditions are expected in an environment where salt (seawater) exists. More specifically, seawater easily intrudes through small gaps since it has a low velocity, and when the seawater that has intruded dries, it leaves salt crystals. If these crystals adhere to the rolling elements, the rotational performance will be greatly degraded.

When the bearings according to the above-described embodiments are attached to driving shaft portions of power transmission units included in various fishing reels used for fishing by the seashore or on the sea, the driving shaft sections can be stably supported for a long period of time.

Table 1 shows the result of a test in which the bearings according to the above-described embodiments and bearings having the structures according to the related art were attached to rotating shaft portions that are rotated by handles of spinning reels, and in which the rotational performances of the bearings (degrees of smoothness the operator feels when rotating the handles) were evaluated after immersing them in salt water.

In Table 1 shown below, Related Art Example 1 is an example in which a bearing on a handle shaft (rotating shaft) is sealed with a commonly known rubber packing material. Related Art Example 2 is an example in which a bearing is provided with a magnetic fluid seal but a magnet is clamped by two pole plates and fixed to an outer ring (type disclosed in Japanese Unexamined Utility Model Registration Application Publication No. 1-91125). Example 1 is an example in which the bearing according to the above-described embodiment illustrated in FIGS. 1 and 2 is used Example 2 is an example in which the bearing according to the above-described embodiment illustrated in FIG. 4 is used Example 3 is an example in which the bearing according to the above-described embodiment illustrated in FIG. 6 is used.

In Table 1, for rotational resistance, ○ indicates that the rotational resistance was low, and X indicates that the rotational resistance was high. For sensory evaluation, ○ indicates that the rotation felt smooth in the rotating operation, and X indicates that the rotation felt rough in the rotating operation. With regard to the test performed after immersion into salt water, the result shown was obtained by performing the rotating operation for 1 minute while the bearing units were immersed in 5% salt water, and then performing the rotating operation again after the bearing units were dried.

The bearings having the above-described sealing functions of the respective structures were also evaluated for productivity in terms of ease of assembly thereof and ease of handling thereof in the process of attaching them to the handle shaft portions. In Table 1, for ease of assembly, ◎ indicates that the assembly was very easy, Δ indicates that the assembly was rather cumbersome, and X indicates that the assembly was cumbersome. In addition, in Table 1, for ease of handling, ◎ indicates that the bearing was very easy to handle, ○ indicates that the bearing was easy to handle, and Δ indicates that the bearing needed to be handled with care.

TABLE 1

| | | Evaluation Result | | | | |
|---|---|---|---|---|---|---|
| | | Rotational performance | | | Productivity | |
| | | Initial | | After Immersion into Salt Water | | |
| | Specifications | Rotational Resistance | Sensory Evaluation | Sensory Evaluation | Ease of Assembly | Ease of Handling |
| Related Art Example 1 | Rubber Packing Type | X | ○ | ○ | △ | ◎ |
| Related Art Example 2 | Magnetic Fluid Type of Related Art | ○ | ○ | X | X | △ |
| Present Invention 1 | First Embodiment | ○ | ○ | ○ | △ | △ |
| Present Invention 2 | Second Embodiment | ○ | ○ | ○ | ◎ | ○ |
| Present Invention 3 | Third Embodiment | ○ | ○ | ○ | ◎ | ◎ |

With regard to the rotational performance, the rubber-packing-type bearing (Related Art Example 1) felt heavy during the operation due to large rotational resistance. The other magnetic-fluid-seal-type bearings (Related Art Example 2 and Examples 1 to 3) had small rotational resistances and felt light during the operation. None of the bearings felt rough during the rotation in the initial stage before they were immersed in salt water. When the rotating operation was performed after the immersion into salt water, the bearing having the structure of Related Art Example 2 felt rough. This is because the salt water intruded into the rolling element section through unsealed regions and formed crystals when it dried. Although the bearing of Related Art Example 1 did not feel rough, it is expected that it will start to feel rough earlier than the bearings of Examples 1 to 3 when the experiment is repeated for a long time and the rubber packing material becomes degraded. In the structures of Examples 1 to 3, the magnetic fluid does not leak out, so that the rotation feels smooth for a long period of time.

With regard to the ease of assembly, it took time to install the rubber packing material in the assembly of the rubber-packing-type bearing (Related Art Example 1), and it took time to assemble the bearing of Example 1 since the process of press-fitting the magnet 12 was delicate. It took a very long time to assemble the bearing of Related Art Example 2 since unitization was difficult. In contrast, the bearings of Examples 2 and 3 were easy to assemble since the attraction force of a magnet is used and it is only necessary to insert a pole plate having the magnet bonded thereto from the exposed-end-surface side.

With regard to the ease of handling, the rubber-packing-type bearing (Related Art Example 1) has no problem. With regard to the magnetic-fluid-seal-type bearings, in Example 3, there was no risk that the magnetic fluid will be wiped off by mistake since the magnetic fluid was disposed in an inner region. In Example 2, the magnetic fluid is disposed in a region slightly further toward the inner region than the opening, and is therefore not easily wiped off. In Example 1 and Related Art Example 2, the magnetic fluid is disposed in an end region, and there is a risk that the magnetic fluid will be wiped off by mistake. Therefore, these bearings need to be handled with care.

As is clear from the above-described test result, compared to the rubber-packing-type bearing and the bearing with a magnetic fluid seal in which one of the inner and outer rings is fixed and the magnetic fluid is retained by the other of the inner and outer rings according to the related art, the structures of the present invention showed superior results in terms of sealing effect and productivity.

REFERENCE SIGNS LIST 1 bearing with magnetic fluid seal
3 inner ring
3a exposed end surface
5 outer ring
5b step
5c perpendicular surface
5a exposed end surface
7 rolling element
10 magnetic fluid seal
12 ring-shaped magnet
14 ring-shaped pole plate
15a, 15b magnetic fluid
G, G1 to G3 gap

The invention claimed is:

1. A bearing with a magnetic fluid seal, wherein a plurality of rolling elements are interposed between an inner ring and an outer ring, and a ring-shaped magnet is arranged at an opening side of the inner and outer rings so as to retain magnetic fluid for sealing the plurality of rolling elements, and wherein the ring-shaped magnet is magnetized such that magnetic poles are oriented in an axial direction, the bearing comprising:
a ring-shaped pole plate arranged so as to be in contact with an outer side surface of the ring-shaped magnet in the axial direction;
outer-ring-side magnetic fluid retained at least between the outer ring and the ring-shaped magnet; and
inner-ring-side magnetic fluid retained at least between the inner ring and the ring-shaped pole plate.

2. The bearing with the magnetic fluid seal according to claim 1,
wherein a step is formed on a rotating-element-side inner surface of the outer ring or the inner ring; and
wherein a distance between the inner and outer rings is greater at an outer side than at an inner side in the axial direction due to the step.

3. The bearing with the magnetic fluid seal according to claim 2, wherein a step surface of the step is a perpendicular surface that is perpendicular to the axial direction or an oblique surface; and wherein the ring-shaped magnet is attached to the perpendicular surface or the oblique surface by a magnetic force.

4. The bearing with the magnetic fluid seal according to claim 1,
wherein a gap is formed between an outer peripheral surface of the ring-shaped pole plate and an inner peripheral surface of the outer ring; and
wherein the magnetic fluid is disposed in the gap.

5. The bearing with the magnetic fluid seal according to claim 1,
wherein the ring-shaped pole plate is press-fitted to the outer ring, and a step gap is formed between the ring-shaped magnet and a step; and
wherein the magnetic fluid is disposed in the step gap.

6. The bearing with the magnetic fluid seal according to claim 1, wherein the ring-shaped magnet is bonded to the ring-shaped pole plate.

7. The bearing with the magnetic fluid seal according to claim 1, wherein surfaces of the inner ring and the outer ring are treated with electrolytic chromic acid.

8. The bearing with the magnetic fluid seal according to claim 1, wherein the outer-ring-side magnetic fluid is arranged between the outer ring and an inner side surface of the ring-shaped magnet in the axial direction.

9. A bearing with a magnetic fluid seal, wherein a plurality of rolling elements are interposed between an inner ring and an outer ring, and a ring-shaped magnet is arranged at an opening side of the inner and outer rings so as to retain magnetic fluid for sealing the plurality of rolling elements, and
wherein the ring-shaped magnet is magnetized such that magnetic poles are oriented in an axial direction, the bearing comprising:
a ring-shaped pole plate arranged so as to be in contact with an outer side surface of the ring-shaped magnet in the axial direction;
outer-ring-side magnetic fluid retained at least between the outer ring and the ring-shaped pole plate; and
inner-ring-side magnetic fluid retained at least-between the inner ring and the ring-shaped magnet.

10. The bearing with the magnetic fluid seal according to claim 9,
wherein a step is formed on a rotating-element-side inner surface of the outer ring or the inner ring; and
wherein a distance between the inner and outer rings is greater at an outer side than at an inner side in the axial direction due to the step.

11. The bearing with the magnetic fluid seal according to claim 10,
wherein a step surface of the step is a perpendicular surface that is perpendicular to the axial direction or an oblique surface; and
wherein the ring-shaped magnet is attached to the perpendicular surface or the oblique surface by a magnetic force.

12. The bearing with the magnetic fluid seal according to claim 9,
wherein a gap is formed between an outer peripheral surface of the ring-shaped pole plate and an inner peripheral surface of the outer ring; and
wherein the magnetic fluid is disposed in the gap.

13. The bearing with the magnetic fluid seal according to claim 9,
wherein the ring-shaped pole plate is press-fitted to the outer ring, and a step gap is formed between the ring-shaped magnet and the step; and
wherein the magnetic fluid is disposed in the step gap.

14. The bearing with the magnetic fluid seal according to claim 9, wherein the ring-shaped magnet is bonded to the ring-shaped pole plate.

15. The bearing with the magnetic fluid seal according to claim 9, wherein surfaces of the inner ring and the outer ring are treated with electrolytic chromic acid.

16. The bearing with the magnetic fluid seal according to claim 9, wherein the inner-ring-side magnetic fluid is arranged between the inner ring and an inner side surface of the ring-shaped magnet in the axial direction.

* * * * *